UNITED STATES PATENT OFFICE.

EPHRAIM LEVITT, OF WESTMOUNT, QUEBEC, CANADA.

PROCESS FOR DECOMPOSING CLAYS.

1,399,217.  Specification of Letters Patent.  Patented Dec. 6, 1921.

No Drawing.  Application filed June 11, 1921.  Serial No. 476,898.

*To all whom it may concern:*

Be it known that I, EPHRAIM LEVITT, a subject of the King of Great Britain, and resident of the city of Westmount, in the Province of Quebec and Dominion of Canada, have invented certain new and useful Improvements in Processes for Decomposing Clays, of which the following is a specification.

This invention relates to improvements in process for decomposing clays, and the objects of the invention are to provide a simple and economical process by which it will be possible to recover in commercially available form the various constituents of clays.

Clays are aluminum silicates containing small percentages of the alkalis and the alkaline earth oxids and varying percentages of iron oxid. The present process is cyclic and provides an economical method of recovering the silicious content in the form of water glass and the aluminum content in the form of aluminum hydroxid. The iron oxid and the alkalis, if in sufficient quantities to warrant their recovery may be recovered, the iron oxid as such and the alkalis as sulfates, as hereinafter described.

The process is based upon the discovery that if a clay is fused with a flux containing boron trioxid, and is later comminuted and suspended in water and treated with sulfur dioxid, bi-sulfites of the various constituent parts are formed which may be conveniently converted into sulfites and then separately recovered.

In practising the invention, the clay or aluminum silicate to be treated is first fused in a suitable furnace with boron trioxid ($B_2O_3$) in such proportion as to provide sufficient boron trioxid to combine with the metal oxids of the clay to form borates.

Instead of using boric oxid itself, borax or any compound that produces boron trioxid at high temperatures such as crude borax may be used.

The melt resulting from the heating of the clay with boron trioxid in the furnace is then ground or otherwise reduced to a fine powder and is suspended in water and sulfur dioxid ($SO_2$) is passed into it until all the borates are decomposed, and the metallic radicals are converted into bi-sulfites. The boric acid $B(OH)_3$ formed during the reaction and the bi-sulfites go into solution. The silica ($SiO_2$) remains undissolved.

The sludge is then filtered. The filter cake consists of silica ($SiO_2$) which readily dissolves in alkali, i. e., soda ash ($Na_2CO_3$) and in caustic soda (NaOH) to form water glass. The filtrate which contains the bi-sulfites and boric acid is heated at or near the boiling point. Sulfur dioxid is given off. The bi-sulfites are converted into sulfites and all the aluminum is thrown down as aluminum hydroxid ($Al(OH)_3$). At the same time, any traces of the sulfites of the alkaline earth metals that may be present will be thrown down. The aluminum hydroxid is then filtered off. The filtrate which contains the sulfites and boric acid is heated, preferably near the boiling point, alone, or with air blown through or with stirring to aid the oxidation. The iron is thrown down as ferric hydroxid $Fe(OH)_3$ and the sulfites are oxidized to sulfates. Basic ferric sulfite is first formed and is immediately hydrolized to ferric hydroxid. The ferric hydroxid is then filtered off. The boric acid is then separated from the filtrate by fractional crystallization. Any sulfates in the filtrate may be separated in the same manner. The yield obtained is theoretical and all the boric acid is recovered and can be used over again.

All the ingredients will react and are used in substantially the quantities corresponding to their chemical equivalent.

In my earlier application, Serial No. 433,438 filed December 27th, 1920, I have described the details of decomposition of potassium bearing silicates such as orthoclase feldspar. The re-actions which occur in the present process are similar to those which occur in my preceding application with the exception of such variations as are introduced by the difference in character of the material treated. It will be seen that in the process, the relatively weak boric acid which serves as a flux during the melting of the clay is replaced when the ground melt is suspended in water by the stronger acid produced by the addition of the sulfur dioxid. All of the ingredients of the original clay are recovered in commercially available form. The silica is recovered as water glass. The aluminum is recovered as aluminum hydroxid, the boric acid is recovered as such and may be used again in the process. Any iron oxid is recovered as such and the alkalis may be recovered as sulfates.

As many changes could be made in the above process and many widely different embodiments of my invention within the scope of the claims, constructed without departing from the spirit or scope thereof, it is intended that all matter contained in the accompanying specification shall be interpreted as illustrative and not in a limiting sense.

What I claim as my invention is:—

1. A step in the decomposition of clay which consists in treating the clay with a flux containing boron trioxid.

2. The herein described method of treating clay which consists of first treating the clay with a flux containing boron trioxid, then comminuting and mixing with water, then treating the solution with sulfur dioxid and then recovering the compounds formed.

3. The herein described method of treating clay which comprises first treating the clay with a flux containing boron trioxid, then comminuting and mixing with water, then treating the solution with sulfur dioxid, then heating the solution and then recovering the compounds formed.

4. The herein described method of treating clay which comprises first treating the clay with a flux containing boron trioxid, then comminuting and mixing with water, then treating the solution with sulfur dioxid, then boiling the solution and separately recovering the compounds formed.

5. The herein described method of treating clay which comprises first treating the clay with a flux containing boron trioxid, then comminuting and mixing with water, then treating the solution with sulfur dioxid, then heating the solution and blowing air therethrough and separately recovering the compounds formed.

6. The herein described method of treating clay which comprises first treating the clay with a flux containing boron trioxid, then comminuting and mixing with water, then treating with sulfur dioxid, then heating the filtrate to throw down aluminum hydroxid, then separating the aluminum hydroxid from the filtrate, then heating and oxidizing the filtrate to throw down the ferric hydroxid and then separating the remaining compounds by fractional crystallization.

7. The herein described method of treating clay which comprises first fluxing the clay, then comminuting the melt, then forming bi-sulfite compounds with the principal ingredients in the melt, then forming sulfate compounds and then separating the different sulfate compounds by fractional crystallization.

In witness whereof I have hereunto set my hand in the presence of two witnesses.

EPHRAIM LEVITT.

Witnesses:
 ISAAC KERT,
 DAVID KERT.